(12) United States Patent
Yamada et al.

(10) Patent No.: US 12,233,855 B2
(45) Date of Patent: Feb. 25, 2025

(54) MOTION MANAGER, VEHICLE, VEHICLE CONTROL METHOD, AND NON-TRANSITORY STORAGE MEDIUM

(71) Applicant: TOYOTA JIDOSHA KABUSHIKI KAISHA, Toyota (JP)

(72) Inventors: Yoshihisa Yamada, Nagoya (JP); Kazuki Miyake, Okazaki (JP); Wataru Kanda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/891,303

(22) Filed: Aug. 19, 2022

(65) Prior Publication Data

US 2023/0079506 A1    Mar. 16, 2023

(30) Foreign Application Priority Data

Sep. 14, 2021 (JP) .................. 2021-149394

(51) Int. Cl.
| | |
|---|---|
| *B60W 30/06* | (2006.01) |
| *B60W 10/18* | (2012.01) |
| *B60W 10/20* | (2006.01) |
| *B60W 60/00* | (2020.01) |

(52) U.S. Cl.
CPC ............. *B60W 30/06* (2013.01); *B60W 10/18* (2013.01); *B60W 10/20* (2013.01); *B60W 60/001* (2020.02)

(58) Field of Classification Search
CPC ...... B60W 30/06; B60W 10/18; B60W 10/20; B60W 60/001; B60W 2050/0091; B60W 2050/0094
See application file for complete search history.

(56) References Cited

U.S. PATENT DOCUMENTS

| | | | | |
|---|---|---|---|---|
| 2011/0066344 | A1* | 3/2011 | Niwa ................... | B60W 10/184 701/70 |
| 2019/0171204 | A1* | 6/2019 | Jang ..................... | B60W 50/082 |
| 2020/0070849 | A1 | 3/2020 | Suzuki et al. | |
| 2022/0258796 | A1* | 8/2022 | Shiogai .............. | B62D 15/0285 |
| 2024/0174227 | A1* | 5/2024 | Nimura .................. | G08G 1/143 |

FOREIGN PATENT DOCUMENTS

| | | |
|---|---|---|
| JP | 2020-032894 A | 3/2020 |
| JP | 2021-049990 A | 4/2021 |

* cited by examiner

*Primary Examiner* — James M McPherson
*Assistant Examiner* — Kyle J Kingsland
(74) *Attorney, Agent, or Firm* — Oliff PLC (57) ABSTRACT

A motion manager configured to request motion of a vehicle according to a kinematic plan on driver assistance of the vehicle to at least one of a plurality of actuators provided in the vehicle includes one or more processors. The one or more processors are configured to receive information indicating a plurality of kinematic plans and classify the information into predetermined items such that a realization method of achieving a purpose of each of the kinematic plans is selectable without specifying or distinguishing a setting source of each of the kinematic plans, arbitrate the kinematic plans, calculate a motion request to the vehicle based on a result of arbitrating the kinematic plans, and distribute the motion request to at least one of the actuators.

12 Claims, 6 Drawing Sheets

ADD APPLICATION

FIG. 4

| (A) REQUESTED PHYSICAL AMOUNT | (B) REQUESTING SOURCE ECU | (C) MOVEMENT DIRECTION | (D) ASSISTANCE LEVEL | (E) EXECUTION PRIORITY | (F) QUIETNESS | (G) OPERATION LIMIT |
|---|---|---|---|---|---|---|
| (1) GROUND ACCELERATION<br>(2) TOTAL DRIVING FORCE<br>(3) PROPULSIVE FORCE<br>(4) BRAKING FORCE<br>(5) STEERING ANGLE | (1) FIRST ECU<br>(2) SECOND ECU<br>(3) THIRD ECU<br>… | (1) LONGITUDINAL<br>(2) LATERAL<br>(3) LONGITUDINAL, LATERAL | (1) MOVEMENT AND FUTURE TARGET<br>(2) MOVEMENT AND IMMEDIATE TARGET<br>(3) FORCE AND STEADY TARGET<br>(4) FORCE AND TRANSITIONAL TARGET<br>(5) MOVEMENT AND TIME PROFILE OF ENTIRE OPERATING AREA<br>(6) FORCE AND TIME PROFILE OF ENTIRE OPERATING AREA | (1) URGENCY<br>(2) NORMAL (LOW G)<br>(3) NORMAL (HIGH G)<br>(4) CONDITION FOR REGULATION AND THE LIKE | (1) EMPHASIS ON RESPONSIVENESS<br>(2) BALANCE BETWEEN RESPONSIVENESS AND QUIETNESS<br>(3) EMPHASIS ON QUIETNESS | (1) FUEL CUT PROHIBITION<br>(2) LOCKUP PROHIBITION<br>(3) DOWNSHIFT PROHIBITION |

FIG. 5

| APPLICATION | FF CONTROL (INITIAL CONTROL AMOUNT) | FB CONTROL GAIN | | CONVENIENTLY REFERRED TO AS |
|---|---|---|---|---|
| | | P ITEM | I ITEM | |
| AEB | S1 | Gp1 | Gi1 | HIGH GAIN |
| ACC | S2 | Gp2 | Gi2 | INTERMEDIATE GAIN |
| LOW-VELOCITY RANGE FUNCTION | S3 | Gp3 | Gi3 | LOW GAIN |

FIG. 6

MOTION MANAGER, VEHICLE, VEHICLE CONTROL METHOD, AND NON-TRANSITORY STORAGE MEDIUM

CROSS-REFERENCE TO RELATED APPLICATION

This application claims priority to Japanese Patent Application No. 2021-149394 filed on Sep. 14, 2021, incorporated herein by reference in its entirety.

BACKGROUND

1. Technical Field

The present disclosure relates to a motion manager, a vehicle, a vehicle control method, and a non-transitory storage medium.

2. Description of Related Art

A vehicle is well-known which is composed of a plurality of applications that set and request kinematic plans on driver assistance of the vehicle, a motion manager that unifies a plurality of kinematic plans from the applications and sets motion requests based on the unified kinematic plan, and an actuator system that realizes set motion requests. In this vehicle, there is a case where, for example, identification information (hereinafter, referred to as an ID) is assigned to the kinematic plan requested to the motion manager from each of the applications such that an application of a requesting source can be specified. The motion manager handles the kinematic plan in association with the assigned ID and sets the motion request.

Regarding such a vehicle, for example, Japanese Unexamined Patent Application Publication No. 2021-049990 discloses a technology in which pieces of identification information of applications are included in requests from a driver assistance system in a control device that receives a plurality of requests from the driver assistance system, arbitrates the requests, and sets the requests to an actuator system.

SUMMARY

In the vehicle as described above, for example, when a new application is added in order to add a new function, a new ID handled by a motion manager is also added, and thus a design change for adding the new ID to all systems (the motion manager and the actuator system) associated with an ID occurs. When there are many design changes, time is required for the design changes, and speed of application update or velocity of product deployment may slow down.

The present disclosure provides a motion manager, a vehicle, a vehicle control method, and a non-transitory storage medium that restricts an increase in the number of design changes caused by an addition of an application even when a new application that sets a kinematic plan is added.

A motion manager according to a first aspect of the present disclosure is configured to request motion of a vehicle according to a kinematic plan on driver assistance of the vehicle to at least one of a plurality of actuators provided in the vehicle. The motion manager includes one or more processors configured to receive information indicating a plurality of kinematic plans and classify the information into predetermined items such that a realization method of achieving a purpose of each of the kinematic plans is selectable without specifying or distinguishing a setting source of each of the kinematic plans, arbitrate the kinematic plans, calculate a motion request to the vehicle based on a result of arbitrating the kinematic plans, and distribute the motion request to at least one of the actuators. The predetermined items include a requested value of a physical amount indicating a motion amount of the vehicle, information indicating a motion direction of the vehicle, and information indicating a priority of the motion of the vehicle according to each of the kinematic plans.

With the above aspect, it is possible to realize the motion of the vehicle according to the received kinematic plan without specifying or distinguishing the setting sources of the kinematic plans (that is, without assigning identification information, such as an ID). For this reason, even when a new application is added, it is possible to restrict an increase in the number of design changes caused by the addition of the application by receiving the kinematic plans that can be classified into the predetermined items.

In the first aspect, the predetermined items may further include information indicating a priority of at least one of responsiveness and quietness of the motion of the vehicle according to the kinematic plan.

As such, it is possible to realize, with high accuracy, the motion of the vehicle according to the received kinematic plan without distinguishing the setting sources of the kinematic plans.

In the first aspect, the predetermined items may further include information indicating a level of the driver assistance.

As such, it is possible to realize, with high accuracy, the motion of the vehicle according the received kinematic plans without distinguishing the setting sources of the kinematic plans.

A vehicle according to a second aspect of the present disclosure includes a driver assistance system including a plurality of applications configured to independently set each of a plurality of kinematic plans on driver assistance of the vehicle, and a motion manager. The motion manager is configured to receive information indicating each of the kinematic plans set in at least one of the applications and classify the information into predetermined items including a requested value of a physical amount indicating a motion amount of the vehicle, information indicating a motion direction of the vehicle, and information indicating a priority of motion of the vehicle according to each of the kinematic plans such that a realization method of achieving a purpose of each of the kinematic plans is selectable without specifying or distinguishing a setting source of each of the kinematic plans, and request the motion of the vehicle according to the kinematic plan to at least one of a plurality of actuators provided in the vehicle.

In the second aspect, the predetermined items may further include information indicating a priority of at least one of responsiveness and quietness of the motion of the vehicle according to the kinematic plan.

In the second aspect, the predetermined items may further include information indicating a level of the driver assistance.

A vehicle control method according to a third aspect of the present disclosure is executed by a computer. The vehicle control method includes receiving information indicating each of a plurality of kinematic plans on driver assistance of a vehicle and classifying the information into predetermined items such that a realization method of achieving a purpose of each of the kinematic plans is selectable without specifying or distinguishing a setting source of each of the kinematic plans, arbitrating the kinematic plans, calculating a motion request to the vehicle based on a result of arbitrating the kinematic plans, and distributing the motion request to at least one of a plurality of actuators provided in the vehicle. The predetermined items includes a requested value of a physical amount indicating a motion amount of the vehicle, information indicating a motion direction of the vehicle, and information indicating a priority of motion of the vehicle according to each of the kinematic plans.

A fourth aspect of the present disclosure is a non-transitory storage medium storing instructions that are executable by a computer and that cause the computer to execute functions. The functions include receiving information indicating each of a plurality of kinematic plans on driver assistance of a vehicle and classifying the information into predetermined items such that a realization method of achieving a purpose of each of the kinematic plans is selectable without specifying or distinguishing a setting source of each of the kinematic plans, arbitrating the kinematic plans, calculating a motion request to the vehicle based on a result of arbitrating the kinematic plans, and distributing the motion request to at least one of a plurality of actuators provided in the vehicle. The predetermined items include a requested value of a physical amount indicating a motion amount of the vehicle, information indicating a motion direction of the vehicle, and information indicating a priority of motion of the vehicle according to each of the kinematic plans.

With each aspect of the present disclosure, it is possible to provide a motion manager, a vehicle, a vehicle control method, and a non-transitory storage medium that restricts an increase in the number of design changes caused by an addition of an application even when a new application that sets a kinematic plan is added.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
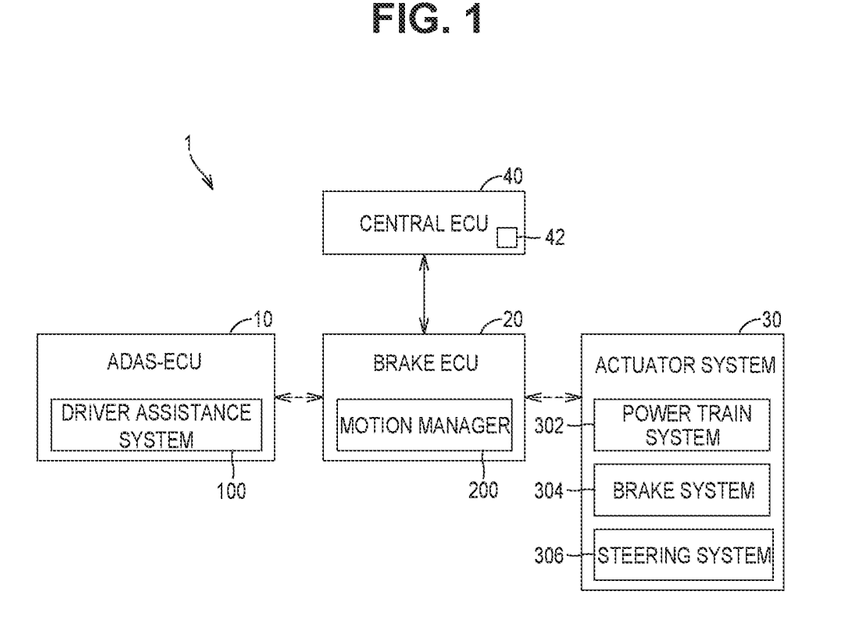
FIG. 1 is a diagram illustrating an example of a configuration of a vehicle.

Hereinafter, embodiments of the present disclosure will be described in detail with reference to the drawings. The same or corresponding parts in the drawings are denoted by the same reference signs and the description thereof will not be repeated. FIG. 1 is a diagram illustrating an example of a configuration of a vehicle 1. As illustrated in FIG. 1, the vehicle 1 includes an ADAS-electronic control unit (ECU) 10, a brake ECU 20, an actuator system 30, and a central ECU 40.

The vehicle 1 may be a vehicle having a configuration capable of realizing a function of a driver assistance system described below, and may be, for example, a vehicle having an engine as a driving source, a battery electric vehicle having an electric motor as a driving source, or a hybrid electric vehicle having an engine and an electric motor mounted thereon and using at least one of them as a driving source.

The ADAS-ECU 10, the brake ECU 20, and the central ECU 40 are all computers each of which has a processor that executes a program, such as a central processing unit (CPU), a memory, and an input/output interface. The memory is an example of a non-transitory storage medium storing a program.

The ADAS-ECU 10 includes a driver assistance system 100) having a function of driver assistance of the vehicle 1. The driver assistance system 100 is configured to realize various functions for assisting driving of the vehicle 1 including at least one of a steering control, a driving control, and a braking control of the vehicle 1 by executing applications mounted on the driver assistance system 100. Examples of the applications mounted on the driver assistance system 100 include an application that realizes a function of an autonomous driving system (AD), an application that realizes a function of an autonomous parking system, and an application (hereinafter, referred to as an ADAS application) that realizes a function of an advanced driver assistance system (ADAS), and the like.

Examples of the ADAS application include at least one of an application that realizes a function of follow-up traveling (an adaptive cruise control (ACC), or the like) that travels while constantly keeping a distance with a preceding vehicle, an application that realizes a function of an auto speed limiter (ASL) that recognizes a vehicle velocity limit and maintains an upper limit of velocity of a subject vehicle, an application that realizes a function of a lane maintenance assistance (a lane keeping assist (LKA), a lane tracing assist (ASL), or the like) that executes maintenance of a lane in which a vehicle travels, an application that realizes a function of a collision damage mitigation braking (an autonomous emergency braking (AEB), a pre-crash safety (PCS), or the like) that executes autonomous braking to mitigate damage caused by collision, and an application that realizes a function of a lane departing warning (a lane departure warning (LDW), a lane departure alert (LDA), or the like) that warns the vehicle 1 of departure from a lane in which it travels.

Each application of the driver assistance system 100 outputs, to the brake ECU 20 (more specifically, the motion manager 200), a request for kinematic plans that guarantees a commercial value (a function) of each application based on information of a vehicle surroundings situation acquired (input) from a plurality of sensors (not shown), an assistance request of a driver, or the like. Examples of the sensors include a vision sensor, such as a forward-looking camera, a radar, light detection and ranging (LiDAR), a position detection device, or the like.

The forward-looking camera is arranged, for example, on the backside of a rear-view mirror in a vehicle cabin and is used for capturing an image of the front of the vehicle. The radar is a distance measuring device that beams radio waves having a short wavelength on an object, detects the radio waves returning from the object, and measures a distance or a direction to the object. The LiDAR is a distance measuring device that beams a laser beam (light, such as infrared rays) in a pulse shape on an object and measures a distance by the time until it is reflected by the object and returns. The position detection device is composed of, for example, the Global Positioning System (GPS) that detects a position of the vehicle 1 using information received from a plurality of satellites orbiting the earth.

Each application acquires information of the vehicle surroundings situation that integrates detection results of one or more sensors as recognition sensor information, and acquires an assistance request of the driver by way of a user interface (not shown), such as a switch. For example, each application can recognize other vehicles, obstacles, or people on the surroundings of the vehicle by image processing on an image or video on the surroundings of the vehicle acquired by the sensors, using artificial intelligence (AI) or image processing processor.

Further, the kinematic plan includes, for example, a request for longitudinal acceleration/deceleration generated in the vehicle 1, a request for a steering angle of the vehicle 1, a request for holding stopping of the vehicle 1, or the like.

Examples of the request for the longitudinal acceleration/deceleration generated in the vehicle 1 include an operation request to a power train system 302 or an operation request to a brake system 304.

Examples of the request for holding the stopping of the vehicle 1 include requests for permitting and prohibiting an operation of at least one of an electric parking brake and a parking lock mechanism (neither shown).

The electric parking brake limits rotation of wheels of the vehicle 1 by, for example, operating an actuator. The electric parking brake may be configured to limit the rotation of the wheels by, for example, operating a brake for a parking brake provided on a part of a plurality of wheels provided on the vehicle 1 using an actuator. Alternatively, the electric parking brake may limit the rotation of the wheels by operating an actuator for the parking brake, arbitrating hydraulic pressure supplied to the brake device of the brake system 304, and operating the brake device.

The parking lock mechanism limits rotation of an output shaft of a transmission by operating an actuator. The parking lock mechanism fits, for example, a protrusion unit provided at a tip of a parking lock pole, a position of which is arbitrated by an actuator into a tooth portion of a gear (a lock gear) provided connected to a rotating element in the transmission of the vehicle 1. As such, the rotation of the output shaft of the transmission is limited and the rotation of driving wheels is limited.

The application mounted on the driver assistance system 100 is not particularly limited to the above-described applications. An application that realizes other functions may be added or an existing application may be omitted, and, in particular, the number of the mounted applications is not limited.

Further, in the present embodiment, a case where the ADAS-ECU 10 includes the driver assistance system 100 composed of a plurality of applications is described, but for example, an ECU may be provided for each application. For example, the driver assistance system 100 may be composed of an ECU having an application that realizes a function of an autonomous driving system mounted thereon, an ECU having an application that realizes a function of an autonomous parking system mounted thereon, and an ECU having an ADAS application mounted thereon.

The brake ECU 20 includes the motion manager 200. In the present embodiment, a case where the brake ECU 20 has a hardware configuration including the motion manager 200 is described as an example, but the motion manager 200 may be provided as a single ECU separately from the brake ECU 20, or may be included in another ECU different from the brake ECU 20. The brake ECU 20 is configured to be communicable with each of the ADAS-ECU 10, various ECUs included in the actuator system 30, and the central ECU 40.

The motion manager 200 requests, to the actuator system 30, motion of the vehicle 1 according to the kinematic plans set in at least one of the applications of the driver assistance system 100. A detailed configuration of the motion manager 200 will be described below.

The actuator system 30 is configured to realize the request for the motion of the vehicle 1 output from the motion manager 200. The actuator system 30 includes a plurality of actuators. FIG. 1 illustrates an example where the actuator system 30 includes, for example, a power train system 302, a brake system 304, and a steering system 306 as actuators. The number of actuators that are requesting destinations of the motion manager 200 is not limited to three as described above, but may be four or more, or may be two or less.

The power train system 302 includes a power train capable of generating a driving force on the driving wheels of the vehicle 1 and an ECU (neither shown) that controls an operation of the power train. The power train includes, for example, at least one of an internal combustion engine, such as a gasoline engine or a diesel engine, a transmission including a gearbox, a differential device, or the like, a motor generator as a driving source, a power accumulation device that accumulates power supplied to the motor generator, a power conversion device that mutually converts power between the motor generator and the power accumulation device, and a power generating source, such as a fuel cell. The ECU that controls the operation of the power train executes a control of a corresponding device so as to realize the request for the motion from the motion manager 200 to the corresponding device in the power train system 302.

The brake system 304 includes, for example, a plurality of brake devices provided on respective wheels of the vehicle 1. The brake devices include, for example, a hydraulic brake, such as a disc brake that generates a braking force using hydraulic pressure. As the brake device, for example, a motor generator that is connected to a wheel and that generates regenerative torque, may be further included. A braking operation of the vehicle 1 using the brake devices is controlled by the brake ECU 20. Separately from the motion manager 200, for example, a control unit (not shown) used for controlling the brake system 304 is provided in the brake ECU 20.

The steering system 306 includes, for example, a steering device capable of changing a steering angle of a steering w % heel (for example, a front wheel) of the vehicle 1 and an ECU (neither shown) that controls an operation of the steering device. The steering device includes, for example, the steering wheel that changes the steering angle according to an operation amount, and an electric power steering (EPS) in which the steering angle can be arbitrated by an actuator, separately from the operation of the steering wheel. The ECU that controls the operation of the steering device controls an operation of an actuator of the EPS.

The central ECU 40 includes a memory 42 capable of updating stored contents. The central ECU 40 is configured to be communicable with, for example, the brake ECU 20, and configured to be communicable with a device (not shown, for example, a server) outside the vehicle 1 by way of a communication module (not shown). When update information is received from a server outside the vehicle 1, the central ECU 40 updates information stored in the memory 42 using the received update information. Predetermined information is stored in the memory 42. The predetermined information includes, for example, information read from various ECUs when the system of the vehicle 1 is started.

In the present embodiment, it is described that the central ECU 40 reads predetermined information from various ECUs when the system of the vehicle 1 is started, but may have a function, such as relaying communication between various ECUs (a gateway function).

Figure 2:
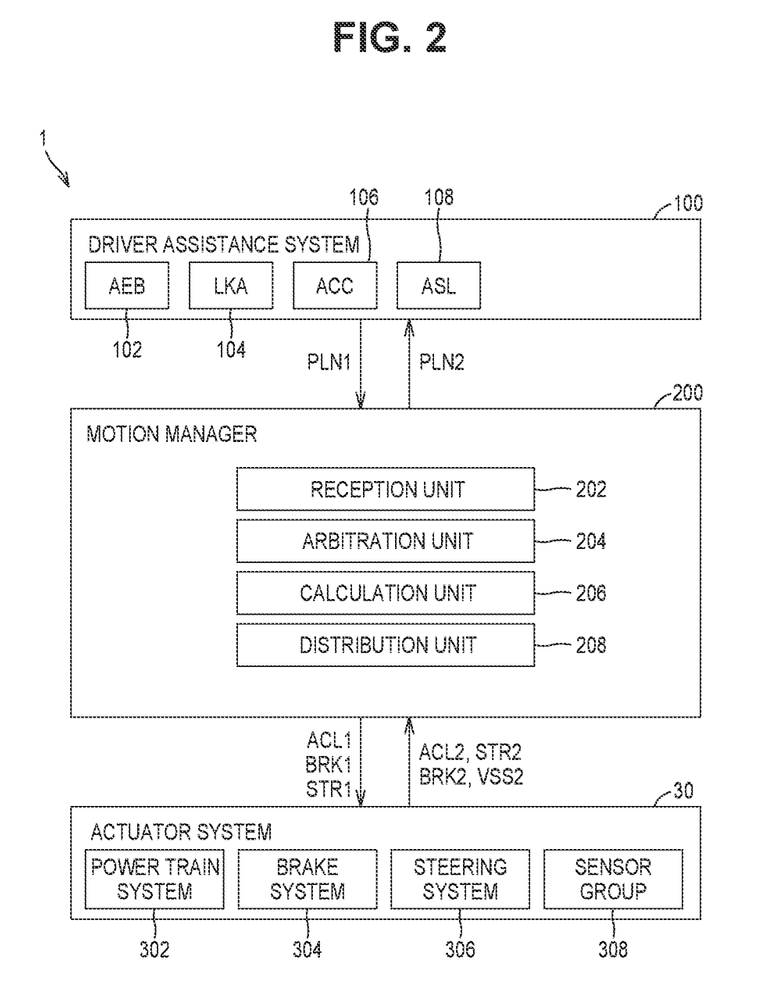
FIG. 2 is a diagram used for describing an example of an operation of a motion manager.

Hereinafter, an example of an operation of the motion manager 200 will be described in detail with reference to FIG. 2. FIG. 2 is a diagram used for describing an example of the operation of the motion manager 200.

FIG. 2 illustrates, as an example, a case where the driver assistance system 100 includes, for example, an AEB 102, an LKA 104, an ACC 106, and an ASL 108 as applications. A request for the kinematic plans set in at least one of the applications is transmitted from the driver assistance system 100 to the motion manager 200 as a request signal PLN1.

The request signal PLN1 includes, for example, information on a target acceleration set in the ACC, the AEB, or the ASL as one of the kinematic plans, information on a target curvature set in the LKA as one of the kinematic plans, or the like.

The motion manager 200 sets the motion requested to the vehicle 1 based on the request for the kinematic plans included in the received request signal PLN1, and requests the actuator system 30 to realize the set motion. In other words, the motion manager 200 transmits, to the actuator system 30, an operation request to the power train system 302 as a request signal ACL1. The motion manager 200 transmits, to the actuator system 30, an operation request to the brake system 304 as a request signal BRK1. Further, the motion manager 200 transmits, to the actuator system 30, an operation request to the steering system 306 as a request signal STR1.

The request signal ACL1 includes, for example, information on a requested value of driving torque or a driving force or information on a method of arbitration (for example, which to select between a maximum value or a minimum value or whether to change a value stepwise or gradually).

The request signal BRK1 includes, for example, information on a requested value of braking torque, information on a method of arbitration (for example, whether to change a value stepwise, gradually, or the like), or information on execution timing of braking (whether to immediately execute, or the like).

The request signal STR1 includes, for example, information on a target steering angle, information on whether the target steering angle is effective, or information on upper and lower limit torques of an assistance torque of an operation of the steering wheel.

The actuator that has received a corresponding request signal from among the actuators composing the actuator system 30 is controlled such that an operation request included in the request signal is realized.

Hereinafter, an example of a configuration of the motion manager 200 will be described. As illustrated in FIG. 2, the motion manager 200 includes a reception unit 202, an arbitration unit 204, a calculation unit 206, and a distribution unit 208.

The reception unit 202 receives a request for the kinematic plans output by one or more applications of the driver assistance system 100. Details of the kinematic plan in the present embodiment will be described below.

The arbitration unit 204 arbitrates the request for a plurality of the kinematic plans received from the respective applications via the reception unit 202. An example of this arbitration processing can be selecting one kinematic plan from among the kinematic plans based on a predetermined selection criterion. Alternatively, another example of the arbitration processing can be setting a new kinematic plan based on the kinematic plans. The arbitration unit 204 may further add predetermined information received from the actuator system 30 and arbitrate the request for the kinematic plans. Further, the arbitration unit 204 may determine whether to temporarily prioritize the motion of the vehicle 1 that is required according to a driver state and a vehicle state over the motion of the vehicle 1 that corresponds to the kinematic plan determined based on an arbitration result.

The calculation unit 206 calculates motion request based on the arbitration result of the request for the kinematic plans in the arbitration unit 204 and the motion of the vehicle 1 that is determined based on the arbitration result. The motion request is a physical amount used for controlling at least one actuator of the actuator system 30, and includes a physical amount different from a physical amount of the request for the kinematic plans. For example, when the request for the kinematic plans (a first request) is a longitudinal acceleration, the calculation unit 206 calculates a value obtained by converting the acceleration into the driving force or the driving torque to be the motion request (a second request).

The distribution unit 208 distributes the motion request calculated by the calculation unit 206 to at least one actuator of the actuator system 30. When, for example, the acceleration of vehicle 1 is requested, the distribution unit 208 distributes the motion request only to the power train system 302. Alternatively, when deceleration of the vehicle 1 is requested, the distribution unit 208 appropriately distributes the motion request to the power train system 302 and the brake system 304 in order to realize a target deceleration.

Information on a state of the power train system 302 is transmitted from the power train system 302 of the actuator system 30 to the motion manager 200 as a signal ACL2. Examples of the information on the state of the power train system 302 include information on an operation of an accelerator pedal, information on an actual driving torque or an actual driving force of the power train system 302, actual shift range information, information on upper and lower limits of the driving torque, information on upper and lower limits of the driving force, or information on reliability of the power train system 302.

Information on a state of the brake system 304 is transmitted from the brake system 304 of the actuator system 30 to the motion manager 200 as a signal BRK2. Examples of the information on the state of the brake system 304 include information on an operation of the brake pedal, information on a braking torque requested by the driver, information on a requested value of the braking torque after arbitration, information on the actual braking torque after arbitration, or information on the reliability of the brake system 304.

Information on a state of the steering system 306 is transmitted from the steering system 306 of the actuator system 30 to the motion manager 200 as a signal STR2. Examples of the information on the state of the steering system 306 include information on reliability of the steering system 306, information on whether the driver grips the steering wheel, information on torque for operating the steering wheel, or information on a rotation angle of the steering wheel.

Further, the actuator system 30 includes a sensor group 308, in addition to the power train system 302, the brake system 304, and the steering system 306 that are described above.

The sensor group 308 includes a plurality of sensors that detect behavior of the vehicle 1. The sensor group 308 includes, for example, a longitudinal G sensor that detects a vehicle body acceleration in the longitudinal direction of the vehicle 1, a lateral G sensor that detects the vehicle body acceleration in the lateral direction of the vehicle 1, a wheel velocity sensor that is provided on each wheel and that detects a wheel velocity, and a yaw rate sensor that detects an angular velocity of the rotation angle (a yaw angle) in the yaw direction. The sensor group 308 transmits information including detection results of the sensors to the motion manager 200 as a signal VSS2. In other words, the signal VSS2 includes, for example, a detection value of the longitudinal G sensor, a detection value of the lateral G sensor, a detection value of the wheel velocity sensor of each wheel, a detection value of the yaw rate sensor, and information on reliability of each sensor. Upon receiving various signals from the actuator system 30, the motion manager 200 transmits predetermined information to the driver assistance system 100 as a signal PLN2.

The configuration of the device mounted on the vehicle 1 and the configuration of the motion manager 200 described above are examples, and can be added, replaced, changed, omitted, or the like as appropriate. Further, a function of each device can be appropriately integrated into one device or distributed to a plurality of devices, and executed.

In the vehicle 1 having the above configuration, as described above, the motion manager 200 arbitrates the requests for the kinematic plans based on a predetermined selection criterion from among the requests for the kinematic plans received from each application of the driver assistance system 100. As the arbitration processing, selecting one kinematic plan from among the kinematic plans based on the predetermined selection criterion is described. However, as a method of selecting one kinematic plan from among the kinematic plans, it is considered that, for example, each application selects a kinematic plan, using identification information (hereinafter, referred to as an "application ID") with which the application, together with the kinematic plan, can be uniquely specified.

Figure 3:
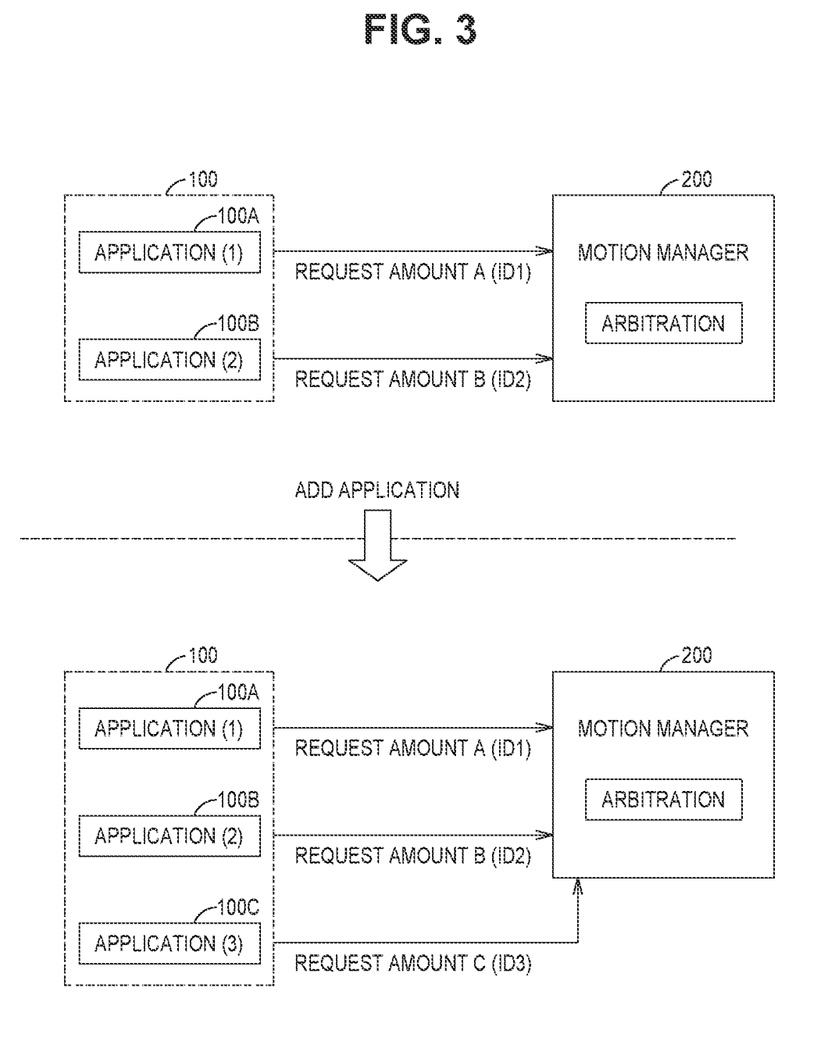
FIG. 3 is a diagram used for describing an example of an operation of arbitrating a plurality of kinematic plans using an application ID.

FIG. 3 is a diagram used for describing an example of an operation of arbitrating the kinematic plans using application IDs.

As illustrated in the upper part of FIG. 3, for example, the driver assistance system 100 includes an application (1) 100A and an application (2) 100B. The motion manager 200 receives, from the application (1) 100A, a request amount A and identification information ID1 with which it is possible to specify that a requesting source of the request amount A is the application (1) 100A. Further, the motion manager 200 receives, from the application (2) 100B, a request amount B and identification information ID2 with which it is possible to specify that a requesting source of the request amount B is the application (2) 100B.

The motion manager 200 selects handling of a request for each ID. Specifically, for example, in a case where a priority is set for each ID and the identification information ID1 has a higher priority than the identification information ID2, and when the motion manager 200 receives the request amount A and the request amount B, the motion manager 200 calculates motion request to the actuator system 30 according to the request amount A.

In such a case, for example, as illustrated in the lower part of FIG. 3, it is assumed that a new application (3) 100C having a new function is added to the driver assistance system 100. At this time, the application (3) 100C outputs a request amount C and identification information ID3 that can identify that a requesting source is the application (3) 100C to the motion manager 200 as a kinematic plan. For this reason, the motion manager 200 is required to set handling of the new identification information ID3 in addition to the existing pieces of identification information ID1, ID2. In other words, a design change for handling of the application (3) 100C newly specified by the identification information ID3 for all the systems (the motion manager 200 and the actuator system 30) associated with the identification information occurs. When there are many design changes, time is required for the design changes, and speed of application update or speed of product deployment may slow down.

Then, in the present embodiment, upon receiving information indicating the kinematic plans from the applications, the motion manager 200 classifies the received information indicating the kinematic plans into the predetermined items including a requested value of a physical amount indicating a motion amount of the vehicle 1, information indicating a motion direction of the vehicle 1, and information indicating a motion priority of the vehicle 1 according to the kinematic plans, and receives the information such that it is possible to select a realization method of achieving a purpose of the kinematic plan without specifying or distinguishing setting sources of the kinematic plans.

As such, it is possible to realize the motion of the vehicle 1 according to the received kinematic plans without specifying or distinguishing the setting sources of the kinematic plans (that is, without assigning identification information, such as an ID). For this reason, even when a new application is added, it is possible to restrict an increase in the number of design changes caused by the addition of the application by receiving the kinematic plans that can be classified into the predetermined items.

Figure 4:
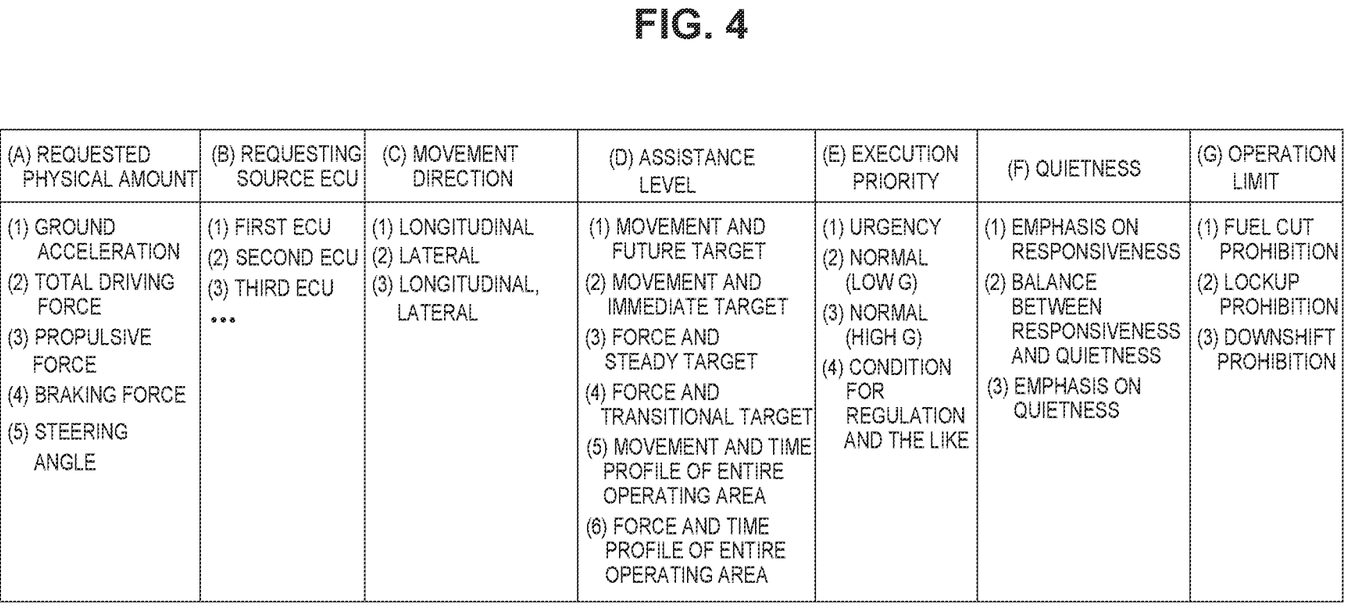
FIG. 4 is a table illustrating an example of predetermined items classified in the motion manager.

Hereinbelow, the predetermined items classified in the motion manager 200 will be described with reference to FIG. 4. FIG. 4 is a table illustrating an example of the predetermined items classified in the motion manager 200.

In the present embodiment, as illustrated in FIG. 4, the predetermined items include (A) a requested physical amount, (B) a requesting source ECU, (C) a movement direction, (D) an assistance level, (E) an execution priority, (F) quietness, and (G) an operation limit. In other words, the predetermined items include items (A) to (D) composed of specification information (static information) with which configurations of the ECUs and the contents of the requests are understood, and items (E) to (G) composed of conditions to be observed (dynamic information) when the application requests are realized.

For example, when a kinematic plan is set in each of the applications, each application transmits the set kinematic plan to the motion manager 200. The motion manager 200 classifies the received kinematic plans into corresponding items from among the above-described (A) to (G) without distinguishing the setting source. The information included in the kinematic plans is set, for example, in a form that can be classified into at least the items (A) and (C) to (G). For information on the item (B) the requesting source ECU, the motion manager 200 acquires information on the ECUs that are the requesting sources of the applications from the central ECU 40 when, for example, the system of the vehicle 1 is started.

Hereinbelow, the predetermined items (A) to (G) classified in the motion manager 200 will be described.

(A) The requested physical amount indicates a requested value of a physical amount for realizing the motion requested to the vehicle 1 in each application. The requested value may be, for example, one value, or may have a certain width by two values, that is, an upper limit value and a lower limit value. The physical amount is set to a different physical amount depending on the application, and includes, for example, acceleration, a force, or a steering angle. Further, the physical amount requested in the application is not limited to one physical amount, and for example, requested values of a plurality of types of physical amounts may be set in one application.

In the present embodiment, (A) the requested physical amount includes, for example, at least one of (1) a requested value of ground acceleration, (2) a requested value of a total driving force, (3) a requested value of a propulsive force, (4) a requested value of a braking force, and (5) a requested value of a steering angle.

(1) The ground acceleration indicates acceleration or deceleration of the vehicle 1. (2) The total driving force indicates, for example, a total driving force of the vehicle 1 including a resistance force, such as traveling resistance. (3) The propulsive force indicates a force applied by the power train system 302 in a proceeding direction of the vehicle 1. (4) The braking force indicates a force that causes the vehicle 1 to brake by a plurality of brake devices of the brake system 304. (5) The steering angle indicates a steering angle of the steering wheel.

(B) The requesting source ECU indicates an ECU having an application. For example, when a plurality of applications is configured in a plurality of ECUs, it is possible to grasp an ECU in which a kinematic plan is set or a route of transferring information from the ECU, by the information of the requesting source ECU. For example, when a first ECU, a second ECU, and a third ECU are provided in the vehicle 1 as ECUs including applications, (B) the requesting source ECU includes, for example, (1) the first ECU, (2) the second ECU, (3) the third ECU. Examples of the first ECU, the second ECU, and the third ECU include, in addition to the ADAS-ECU 10 including the above-described applications, an ECU that sets a kinematic plan on the EPB or the parking lock mechanism, an ECU that executes interface with an autonomous driving kit, or the like. The motion manager 200 may grasp, based on the information of the requesting source ECU, what application is included in the vehicle 1 (for example, whether it is a vehicle capable of autonomous driving, whether it is a vehicle that does not have a function of autonomous driving but has a function of autonomous parking, or whether it is a vehicle that does not have the function of autonomous driving and is capable of controlling only the EPB or the parking lock mechanism).

(C) The movement direction indicates the direction of motion (movement) requested to the vehicle 1. Examples of the movement of the vehicle 1 requested by the application includes a movement in the longitudinal direction, a movement in the right-left direction (the lateral direction), and a movement in which the longitudinal direction and the right-left direction are linked. For this reason, (C) the movement direction includes one of (1) the longitudinal direction, (2) the right-left direction, and (3) the longitudinal+right-left direction.

As (D) the assistance level, whether the application requests, to the vehicle 1, for a movement (a change in the position) or a force (a change in velocity or acceleration), and further, timing, a period, or the like for realizing the request are set with a priority. For this reason, (D) the assistance level includes, for example, one of (1) a movement and a future target, (2) a movement and an immediate target, (3) a force and a steady target, (4) a force and a transitional target, (5) a movement and a time profile of an entire operating area, and (6) a force and a time profile of the entire operating area. The priority among these (1) to (6) is set in advance. The priority may be, for example, in the order of numbers (1) to (6), higher as the number is smaller, or set separately from the numbers (1) to (6).

(E) The execution priority indicates the priority of executing the kinematic plan set in the application. (E) the execution priority includes, for example, one of (1) urgency, (2) normal (low G), (3) normal (high G), and (4) a condition for a regulation and the like. (1) The urgency is motion having a high urgency and is set to the highest priority. For example, information with which it is possible to specify whether the movement of the vehicle 1 in the longitudinal direction is urgent or the movement of the vehicle 1 in the turning direction is urgent is added to (1) the urgency. (2) The normal (low G) is motion in a low acceleration range in which the acceleration of the vehicle 1 is equal to or lower than a threshold value, and is set to a lower priority than (1) the urgency. (3) The normal (high G) is motion in an acceleration range in which the acceleration of the vehicle 1 is higher than the threshold value, and is set to a lower priority than (2) the normal (low G). (4) is motion according to a condition for a regulation and the like, and is set to a lower priority than (3) the normal (high G).

For example, when the kinematic plan including a deceleration request is output from the AEB application, (E) the execution priority corresponding to the kinematic plan in the motion manager 200 is classified into (1) the urgency (in the longitudinal direction of the vehicle 1).

(F) Quietness indicates whether the motion of the vehicle 1 having high quietness is requested, the motion of the vehicle 1 having high responsiveness is requested, or the motion of the vehicle 1 having a balance between quietness and responsiveness is requested. (F) quietness includes one of (1) emphasis on responsiveness, (2) a balance between responsiveness and quietness, and (3) emphasis on quietness.

For example, when the kinematic plan including the deceleration request is output from the AEB application, (F) quietness corresponding to the kinematic plan in the motion manager 200 is classified into (1) the emphasis on responsiveness.

For example, when (1) the emphasis on responsiveness is set as (F) quietness, values corresponding to a "high gain" are set as control parameters for a feed forward (FF) control and a feed back (FB) control. Further, for example, when (2) the balance between responsiveness and quietness is set as (F) quietness, values corresponding to an "intermediate gain" are set as the control parameters for the FF control and the FB control. Further, for example, when (3) the emphasis on quietness is set as (F) quietness, values corresponding to a "low gain" are set as the control parameters for the FF control and the FB control.

Figure 5:
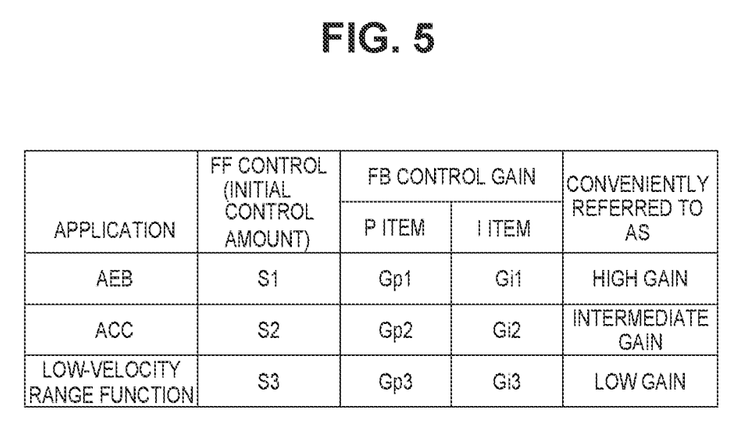
FIG. 5 illustrates an example of control parameters on quietness/responsiveness set according to applications.

FIG. 5 illustrates an example of the control parameters on quietness/responsiveness set according to applications. FIG. 5 illustrates, for example, control parameters (initial control amounts in the FF control and gains in the FB control) in the kinematic plan set in each of the AEB application, the ACC application, and an application of a low-velocity range function. Examples of the low-velocity range function include a velocity control at the time of autonomous parking or a velocity control in a velocity range lower than an ACC velocity range. Further, in FIG. 5, a setting pattern having responsiveness higher than other applications among setting patterns of the setting parameters, which are set for respective applications, is conveniently referred to as the "high gain", a setting pattern having responsiveness lower than other applications is referred to as the "low gain", and a setting pattern having intermediate responsiveness compared to other applications is referred to as the "intermediate gain".

For example, the kinematic plan set in the AEB application is classified into (1) the emphasis on responsiveness of the items of (F) quietness. In this case, values of the high gain are set as the control parameters. In other words, when the kinematic plan set in the AEB application is realized, S1 is set as the initial control amount of the FF control in the velocity control, and Gp1 is set as a gain of a P item and Gi1 is set as a gain of an I item in the FB control of the vehicle 1.

For example, the kinematic plan set in the ACC application is classified into (2) the balance between responsiveness and quietness of the items of (F) quietness. In this case, values of the intermediate gain are set as the control parameters. In other words, when the kinematic plan set in the ACC application is realized, S2 is set as the initial control amount of the FF control in the velocity control, and Gp2 is set as a gain of the P item and Gi2 is set as a gain of the I item in the FB control of the vehicle 1.

For example, the kinematic plan set in the application of the low-velocity range function is classified into (3) the emphasis on quietness of the items of (F) quietness. In this case, values of the low gain are set as the control parameters. In other words, when the kinematic plan set in the application of the low-velocity range function is realized, S3 is set as the initial control amount of the FF control in the velocity control, and Gp3 is set as a gain of the P item and Gi3 is set as a gain of the I item in the FB control of the vehicle 1.

(G) The operation limit is an item that defines whether an operation of a specific device mounted on the vehicle 1 is permitted. Examples of the specific device include an automatic transmission with a lockup mechanism for an engine or a torque converter. For this reason, for example, when the vehicle 1 includes the automatic transmission with the lockup mechanism for the engine or the torque converter, (G) operation limit may include at least one of (1) fuel cut prohibition and (2) torque converter lockup prohibition, and (3) a downshift prohibition.

Each application sets a kinematic plan and transmits the set kinematic plan to the motion manager 200. When a new application is added, the newly added application sets the kinematic plan in a form that can be classified into the predetermined items (A) to (G) described above, and the set kinematic plan is transmitted to the motion manager 200.

The motion manager 200 receives the kinematic plan from each of the applications including the application added via the reception unit 202. The arbitration unit 204 of the motion manager 200 arbitrates the received kinematic plans.

For example, the motion manager 200 selects one of the kinematic plans classified into (A) to (G). The motion manager 200 selects, for example, a kinematic plan having a high priority in (E) the execution priority from among the received kinematic plans. Alternatively, when there is a plurality of kinematic plans having the same priority in (E) the execution priority from among the received kinematic plans, the motion manager 200 selects a kinematic plan having a high priority in (D) the assistance level.

The calculation unit 206 of the motion manager 200 calculates the motion request to the vehicle 1 following the predetermined items (A) to (G) corresponding to the selected kinematic plan such that the motion of the vehicle 1 is realized according to the selected kinematic plan. The distribution unit 208 of the motion manager 200 distributes the calculated motion request to at least one actuator corresponding to (C) the movement direction from among the actuators in the actuator system 30.

For example, when the system of the vehicle 1 is started, the motion manager 200 acquires, from the central ECU 40, predetermined information including information in which the requesting source ECUs are associated with the applications. As such, the motion manager 200 can grasp the requesting source ECU and recognize what application is included and what kinematic plan is set in the vehicle 1.

When the system of the vehicle 1 is started, the motion manager 200 acquires information indicating correspondence between the applications and the requesting ECUs from the memory 42 of the central ECU 40, and acquires information of items into which the kinematic plan is classified. By these pieces of information, items of the requests illustrated in the above-described (A) to (D) and the items of the operation conditions of the above-described (E) to (G) are set as the items classified by the motion manager 200.

Figure 6:
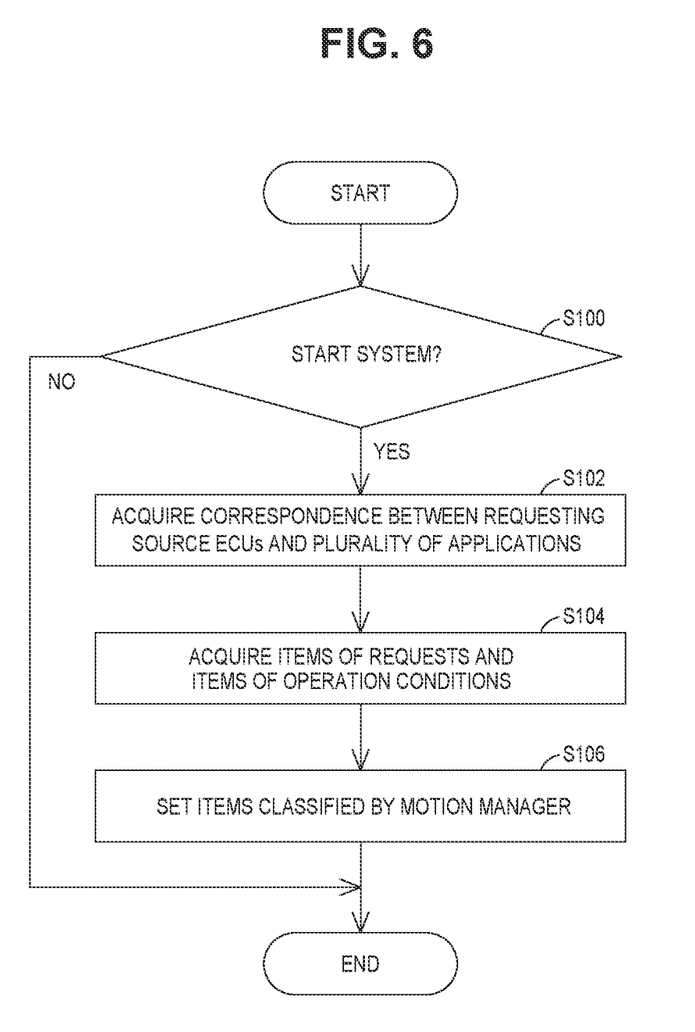
FIG. 6 is a flowchart illustrating an example of processing executed in the motion manager when a system of the vehicle is started.

FIG. 6 is a flowchart illustrating an example of processing executed in the motion manager 200 when the system of the vehicle 1 is started.

At step (hereinafter, step is referred to as S) 100, the motion manager 200 determines whether the system of the vehicle 1 is started. For example, when the system of the vehicle 1 is in a stopped state, the motion manager 200 may determine that the system of the vehicle 1 is started at a time at which a start condition for starting the system of the vehicle 1 is satisfied. For example, in the case where the system of the vehicle 1 is in the stopped state and an operation of starting the system of the vehicle 1 is executed by a user, the motion manager 200 may determine that the start condition is satisfied and the system of the vehicle 1 is started. When the motion manager 200 determines that the system of the vehicle 1 is started (YES in S100), the process proceeds to S102. On the other hand, when the motion manager 200 determines that the system of the vehicle 1 is not started (NO in S100), the process ends.

In S102, the motion manager 200 acquires the information indicating the correspondence between the requesting source ECUs and the applications from the memory 42 of the central ECU 40.

In S104, the motion manager 200 acquires the items of the requests and the items of the operation conditions as the items classified by the motion manager 200 from the memory 42 of the central ECU 40.

In S106, the motion manager 200 sets the items classified by the motion manager 200. The motion manager 200 may omit, for example, one item of the above-described items (A) to (G) (for example, (G) the operation limit or the like) from the correspondence between the applications mounted on the vehicle 1 and the requesting source ECUs, and set the items classified by the motion manager 200.

An example of the operation of the motion manager 200 based on the structure and the flowchart as above will be described.

For example, it is assumed that the system of the vehicle 1 is in the stopped state. When the user operates a start switch and the system of the vehicle 1 is started (YES in S100), the information indicating the correspondence between the requesting source ECUs and the applications is acquired from the central ECU 40 (S102). Then, the items of the requests and the items of the operation conditions are acquired from the central ECU 40 as the items classified by the motion manager 200 (S104). The items (the above-described (A) to (G)) classified by the motion manager 200 using the acquired information are set before calculation of a main function of each ECU is started (S106).

For this reason, after the system of the vehicle 1 is started, the motion manager 200 classifies the kinematic plan received from each application into the above-described items (A) to (G) and receives them. Upon receiving the kinematic plans, the motion manager 200 selects one kinematic plan according to a predetermined criterion (the priority), such as the execution priority or the assistance level. The motion manager 200 realizes the motion of the vehicle 1 according to the selected kinematic plan by calculating the motion request for realizing the selected kinematic plan and distributes it to at least one actuator of the actuator system 30.

As above, with the vehicle 1 according to the present embodiment, it is possible to realize the motion of the vehicle 1 according to the kinematic plan set in the application without specifying or distinguishing a setting source of a kinematic plan (that is, without assigning an application ID or the like). For this reason, when a new application is added, it is possible to restrict an increase in the number of design changes. Therefore, even when an application setting the kinematic plan is added, it is possible to provide a motion manager, a vehicle, a vehicle control method, and a program that restricts an increase in the number of design changes caused by an increase in the number of applications.

Further, since the predetermined items include the information indicating the level of driver assistance and the information indicating the priority of at least one of the responsiveness and quietness of the motion of the vehicle 1 according to the kinematic plan, it is possible to realize, with high accuracy, the motion of the vehicle 1 according to the kinematic plan set in the application without distinguishing the setting source of the kinematic plan.

Further, by using an updatable memory 42 of the central ECU 40, for example, when applications and ECUs that enable the autonomous driving, autonomous parking, and all the other driver assistance are mounted on the vehicle 1, it is possible to realize, by a common ECU, a vehicle that enables autonomous driving, autonomous parking, and other driver assistance, a vehicle that disables autonomous driving but enables autonomous parking and other driver assistance, and a vehicle that disables autonomous driving and autonomous parking but enables other driver assistance only by changing the correspondence between the requesting source ECUs in the memory and the applications. Further, by updating the memory 42 after shipping from a vehicle assembly factory, it is possible to release the disabled function.

Hereinafter, modified examples will be described. In the present embodiment, as the predetermined items classified by the motion manager 200, the above-described items (A) to (G) are listed as an example. However, the items classified by the motion manager 200 are not limited to the seven items described above, and, for example, at least (A) the requested physical amount, (C) the movement direction, and (E) the execution priority may be included from among the above-described items (A) to (G).

Further, in the present embodiment, it is described that the kinematic plans from the applications are classified into (A) and (C) to (G), and the information on (B) the requesting ECUs is acquired from the central ECU 40 when the system of the vehicle 1 is started. However, the kinematic plans may include the information on (B) the requesting ECUs.

Further, in the present embodiment, it is described that the configuration of the motion manager 200 includes the reception unit 202, the arbitration unit 204, the calculation unit 206, and the distribution unit 208 as an example. However, the configuration of the motion manager 200 may include, for example, at least a first motion manager that receives a kinematic plan from an application and a second motion manager that can communicate with the first motion manager and request the actuator system 30 to realize motion. In this case, the function of the arbitration unit 204, the function of the calculation unit 206, and the function of the distribution unit 208 may be implemented on one of the first motion manager or the second motion manager.

The above-described modified examples may be executed by appropriately combining all or a part thereof. The embodiment disclosed in the present disclosure needs to be considered as illustrative in all points and not restrictive. The scope of the present disclosure is shown not by the above description of the embodiments but by the claims, and is intended to include meanings equivalent to the claims and all modifications within the scope thereof.

What is claimed is:

1. A motion manager configured to request motion of a vehicle according to a kinematic plan on driver assistance of the vehicle to at least one of a plurality of actuators provided in the vehicle, the motion manager comprising one or more processors configured to:

receive a plurality of kinematic plans and classify each of the received kinematic plans into predetermined items without specifying a setting source of each of the kinematic plans, the predetermined items including a requested value of a physical amount indicating a motion amount of the vehicle, information indicating a motion direction of the vehicle, and information indicating a priority of the motion of the vehicle according to each of the kinematic plans;

arbitrate the kinematic plans based on an item into which each respective kinematic plan is classified into among the predetermined items;

calculate a motion request to the vehicle based on a result of arbitrating the kinematic plans; and distribute the motion request to at least one of the actuators.

2. The motion manager according to claim 1, wherein the predetermined items further include information indicating a priority of at least one of responsiveness and quietness of the motion of the vehicle.

3. The motion manager according to claim 1, wherein the predetermined items further include information indicating a level of the driver assistance.

4. A vehicle comprising:

a driver assistance system including a plurality of applications configured to independently set each of a plurality of kinematic plans on driver assistance of the vehicle; and a motion manager configured to:

receive the plurality of kinematic plans set in at least one of the applications and classify each of the received plurality of kinematic plans into predetermined items including a requested value of a physical amount indicating a motion amount of the vehicle, information indicating a motion direction of the vehicle, and information indicating a priority of motion of the vehicle according to each of the kinematic plans, without specifying a setting source of each of the kinematic plans;

arbitrate the kinematic plans based on an item into which each respective kinematic plan is classified into among the predetermined items; and request a motion of the vehicle according to the arbitrated kinematic plans to at least one of a plurality of actuators provided in the vehicle.

5. The vehicle according to claim 4, wherein the predetermined items further include information indicating a priority of at least one of responsiveness and quietness of the motion of the vehicle.

6. The vehicle according to claim 4, wherein the predetermined items further include information indicating a level of the driver assistance.

7. A vehicle control method executed by a computer, the vehicle control method comprising:

receiving a plurality of kinematic plans on driver assistance of a vehicle and classifying each of the received plurality of kinematic plans into predetermined items without specifying a setting source of each of the kinematic plans, the predetermined items including a requested value of a physical amount indicating a motion amount of the vehicle, information indicating a motion direction of the vehicle, and information indicating a priority of motion of the vehicle according to each of the kinematic plans;

arbitrating the kinematic plans based on an item into which each respective kinematic plan is classified into among the predetermined items;

calculating a motion request to the vehicle based on a result of arbitrating the kinematic plans; and distributing the motion request to at least one of a plurality of actuators provided in the vehicle.

8. A non-transitory storage medium storing instructions that are executable by a computer and that cause the computer to execute functions comprising:

receiving a plurality of kinematic plans on driver assistance of a vehicle and classifying each of the received plurality of kinematic plans into predetermined items without specifying a setting source of each of the kinematic plans, the predetermined items including a requested value of a physical amount indicating a motion amount of the vehicle, information indicating a motion direction of the vehicle, and information indicating a priority of motion of the vehicle according to each of the kinematic plans;

arbitrating the kinematic plans based on an item into which each respective kinematic plan is classified into among the predetermined items;

calculating a motion request to the vehicle based on a result of arbitrating the kinematic plans; and distributing the motion request to at least one of a plurality of actuators provided in the vehicle.

9. The motion manager according to claim 1, wherein the one or more processors are configured to:

in arbitrating the kinematic plans, select a single one of the kinematic plans, and in calculating the motion request, calculate the motion request based on the selected single kinematic plan out of the kinematic plans.

10. The motion manager according to claim 9, wherein the one or more processors are configured to select the kinematic plan that is classified into a first preset item among the predetermined items.

11. The motion manager according to claim 10, wherein, when there are two or more kinematic plans that are classified into the first preset item, a kinematic plan that is classified into a second preset item is selected among the two or more kinematic plans.

12. The motion manager according to claim 1, wherein the predetermined items are determined by the one or more processors of the motion manager at a start time of the vehicle based on information that is acquired from a memory of a central ECU of the vehicle as the vehicle is started.

* * * * *